United States Patent
Hirano et al.

(10) Patent No.: US 11,424,434 B2
(45) Date of Patent: Aug. 23, 2022

(54) PRODUCTION METHOD FOR SEPARATOR-INCLUDING ELECTRODE PLATE AND PRODUCTION METHOD FOR BATTERY

(71) Applicant: TOYOTA JIDOSHA KABUSHIKI KAISHA, Toyota (JP)

(72) Inventors: Yu Hirano, Nisshin (JP); Akio Minakuchi, Okazaki (JP); Kohei Matsunobu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 16/841,811

(22) Filed: Apr. 7, 2020

(65) Prior Publication Data
US 2020/0343528 A1 Oct. 29, 2020

(30) Foreign Application Priority Data

Apr. 25, 2019 (JP) .............................. JP2019-083518

(51) Int. Cl.

| | |
|---|---|
| *H01M 6/00* | (2006.01) |
| *H01M 4/04* | (2006.01) |
| *H01M 4/139* | (2010.01) |
| *H01M 10/0525* | (2010.01) |
| *H01M 10/058* | (2010.01) |
| *H01M 50/46* | (2021.01) |

(Continued)

(52) U.S. Cl.
CPC ......... *H01M 4/0404* (2013.01); *H01M 4/139* (2013.01); *H01M 10/058* (2013.01); *H01M 10/0525* (2013.01); *H01M 50/403* (2021.01); *H01M 50/411* (2021.01); *H01M 50/46* (2021.01); *Y10T 29/49115* (2015.01)

(58) Field of Classification Search
CPC ....... Y02E 60/10; H01M 50/46; H01M 4/622; H01M 50/489; H01M 50/463; Y02T 10/70; H01G 11/52; Y10T 29/49115
USPC ...... 29/623.5, 623.1, 623.2, 623.4, 729, 730
See application file for complete search history.

(56) References Cited

U.S. PATENT DOCUMENTS

| | | | |
|---|---|---|---|
| 6,180,281 B1 * | 1/2001 | Schneider ......... | H01M 10/0585 429/129 |
| 2014/0147726 A1 * | 5/2014 | Toyoda ................ | H01M 50/411 429/144 |

(Continued)

FOREIGN PATENT DOCUMENTS

| | | |
|---|---|---|
| JP | 2012251057 A | 12/2012 |
| JP | 2016131092 A | 7/2016 |

(Continued)

*Primary Examiner* — Thiem D Phan
(74) *Attorney, Agent, or Firm* — Dickinson Wright, PLLC

(57) ABSTRACT

A production method for a separator-including electrode plate includes a step of forming an undried active material layer on a current collector foil, a step of forming an undried separator layer on the undried active material layer by applying a polymer solution containing a water-soluble polymer, water and a high-boiling point solvent, and a step of forming the porous separator layer by vaporizing the high-boiling point solvent after depositing the water-soluble polymer in the shape of a three-dimensional network by vaporizing the water contained in the undried separator layer, and forming the active material layer by vaporizing the dispersion medium contained in the undried active material layer.

5 Claims, 6 Drawing Sheets

(51) Int. Cl.
*H01M 50/403* (2021.01)
*H01M 50/411* (2021.01)

(56) References Cited

U.S. PATENT DOCUMENTS

| | | |
|---|---|---|
| 2016/0204434 A1 | 7/2016 | Uezono et al. |
| 2020/0044217 A1 | 2/2020 | Minakuchi et al. |

FOREIGN PATENT DOCUMENTS

| | | |
|---|---|---|
| JP | 2019148190 A | 9/2019 |
| JP | 2020024811 A | 2/2020 |

* cited by examiner 30 mm    EXAMPLE 1

30 mm    COMPARATIVE EXAMPLE 1

PRODUCTION METHOD FOR SEPARATOR-INCLUDING ELECTRODE PLATE AND PRODUCTION METHOD FOR BATTERY

INCORPORATION BY REFERENCE

The disclosure of Japanese Patent Application No. 2019-083518 filed on Apr. 25, 2019 including the specification, drawings and abstract is incorporated herein by reference in its entirety.

BACKGROUND

1. Technical Field

The disclosure relates to a production method for a separator-including electrode plate including an active material layer formed on a current collector foil and a porous separator layer formed on the active material layer, and a production method for a battery.

2. Description of Related Art

A method in which a porous material is formed by using a water-soluble polymer such as polyvinyl alcohol (PVA) is known. For example, Japanese Patent Application Publication No. 2012-251057 discloses such a method (see claim 1, paragraph [0033] and the like of JP 2012-251057 A). According to JP 2012-251057 A, a PVA solution is prepared first by dissolving PVA in water. Next, a first solvent having miscibility with water is added to the PVA solution under heating. Thereafter, the resultant PVA solution is applied onto, for example, a substrate, and the resultant is further cooled to obtain a molded material having PVA deposited thereon. Then, the molded material is immersed in a second solvent to replace a mixed solvent (water and the first solvent) contained in the molded material with the second solvent. Thereafter, the resultant is dried under reduced pressure to obtain a porous material containing PVA.

SUMMARY

In formation of a separator layer of a separator-including electrode plate for use in a battery (an electrode plate including an active material layer formed on a current collector foil, and a separator layer integrally formed thereon), the above-described formation method for a porous material may be employed. The above-described formation method is, however, complicated in process, poor in productivity and high in cost. Besides, the above-described formation method is a method suitable for producing a single separator, and is difficult to apply to a case where a separator layer is provided on an electrode plate.

Therefore, the present inventor examined the following method: First, a polymer solution containing a water-soluble polymer, such as PVA, water and a high-boiling point solvent that is more difficult to dissoluble the water-soluble polymer therein than in water and has a higher boiling point than water, wherein the polymer is dissolved in the polymer solution, is prepared. The polymer solution is applied onto an electrode plate to form an undried separator layer on the electrode plate. Thereafter, water is vaporized from the undried separator layer to deposit the water-soluble polymer in the shape of a three-dimensional network, and thereafter, the high-boiling point solvent is vaporized therefrom to obtain a porous separator layer.

It has been found that when a separator layer is formed by this method, however, the separator layer cannot be uniformly formed, and voids are formed within the separator layer or through-holes (holes penetrating through the separator layer to expose, on the bottoms, an active material layer of an electrode plate) are formed in some portions of the separator layer. The reason is probably as follows: When an undried separator layer is formed by applying a polymer solution on a dried active material layer, a part of the polymer solution used for forming the undried separator layer enters voids of the active material layer and the air present in the voids of the active material layer moves into the undried separator layer before the undried separator layer is dried to form the separator layer. Therefore, the air thus moving forms voids in the undried separator layer, and furthermore, the voids are enlarged to form a through-hole in the undried separator layer. Thus, these voids and through-holes remain in the separator layer after drying.

The present disclosure was accomplished in consideration of such current situation, and provides a production method for a separator-including electrode plate by which a separator layer can be uniformly formed on an active material layer, and a production method for a battery including an electrode assembly having a separator-including electrode plate.

One aspect of the present disclosure for solving the above-described problems is a production method for a separator-including electrode plate including a current collector foil, an active material layer formed on the current collector foil, and a porous separator layer formed on the active material layer, and the production method includes an undried active material layer forming step of forming, on the current collector foil, an undried active material layer containing active material particles and a dispersion medium; an undried separator layer forming step of forming, on the undried active material layer, an undried separator layer by applying, with the dispersion medium contained in the undried active material layer, a polymer solution containing a water-soluble polymer, water and a high-boiling point solvent that is more difficult to dissolve the water-soluble polymer therein than in water and has a higher boiling point than water, wherein the water-soluble polymer is dissolved in the polymer solution; and a drying step of forming the porous separator layer by vaporizing the high-boiling point solvent after depositing the water-soluble polymer in the shape of a three-dimensional network by vaporizing the water contained in the undried separator layer, and forming the active material layer by vaporizing the dispersion medium contained in the undried active material layer.

In the production method for a separator-including electrode plate, after the undried active material layer is formed on the current collector foil, the polymer solution is applied, with the dispersion medium contained in the undried active material layer, to form the undried separator layer on the undried active material layer. Since the dispersion medium is contained in the undried active material layer, the undried active material layer has a smaller number of voids correspondingly to the volume of the dispersion medium contained therein as compared with an active material layer obtained by drying. Therefore, the phenomenon that a part of the polymer solution used for forming the undried separator layer enters voids of the undried active material layer and thus the air present in the voids of the undried active material layer moves into the undried separator layer before forming the separator layer by drying the undried separator layer can be prevented or inhibited. Accordingly, the formation of voids and through-holes in the undried separator layer and also the formation of voids and through-holes in the separator layer obtained by drying can be prevented or inhibited, and thus, the separator layer can be uniformly formed on the active material layer.

It is noted that the "undried separator layer forming step" may be performed in a state where the dispersion medium is contained in the undried active material layer, and the undried separator layer forming step may be performed subsequently to the undried active material layer forming step (the undried separator layer may be formed immediately after forming the undried active material layer), or the undried separator layer forming step may be performed after vaporizing a part of (half-drying) the dispersion medium contained in the undried active material layer after the undried active material layer forming step. In particular, when the undried separator layer forming step is performed subsequently to the undried active material layer forming step, the undried active material layer is filled with the dispersion medium and includes few voids in forming the undried separator layer. Therefore, the phenomenon that a part of the polymer solution used for forming the undried separator layer enters voids of the undried active material layer and thus the air present in the voids of the undried active material layer moves into the undried separator layer can be prevented, and hence, the separator layer can be more uniformly formed on the active material layer.

Examples of the "water-soluble polymer" include a water-soluble polymer having a hydroxyl group such as polyvinyl alcohol (PVA) or polyvinyl pyrrolidone (PVP), a water-soluble cellulose derivative such as hydroxyethyl cellulose (HEC) or carboxymethyl cellulose (CMC), a water-soluble polymer having an amide group, a water-soluble polymer having ether, a water-soluble polymer having an amino group, and water-soluble polysaccharides. It is noted that the water-soluble polymer has solubility in water at 25° C. of preferably 1 g or more per 100 g of water.

Examples of the "high-boiling point solvent that is more difficult to dissolve the water-soluble polymer therein than in water and has a higher boiling point than water" include a carbonate-based high-boiling point solvent such as γ-butyrolactone (GBL) (boiling point: 204° C.), propylene carbonate (PC) (boiling point: 240° C.), ethylene carbonate (boiling point: 261° C.) or butylene carbonate (boiling point 250° C.), a sulfone-based high-boiling point solvent such as dimethyl sulfone (boiling point: 248° C.) or diethyl sulfone (boiling point: 246° C.), and a nitrile-based high-boiling point solvent such as succinonitrile (boiling point: 265 to 267° C.). It is noted that the high-boiling point solvent is preferably a solvent that is compatible with water like, for example, GBL, or forms an emulsion to be homogeneously dispersed in water like, for example, PC.

As a method for forming the undried active material layer in the "undried active material layer forming step", for example, the undried active material layer can be formed by preparing an active material paste in a liquid form in which active material particles or the like are dispersed in the dispersion medium, and applying the active material paste onto the current collector foil. Alternatively, the undried active material layer can be formed by preparing a particle aggregation aggregately containing wet particles including active material particles, the dispersion medium and the like, and rolling the particle aggregation by a roll press or the like as described later.

Besides, in the production method for a separator-including electrode plate, the undried separator layer may be formed on the undried active material layer having a solid content rate NV of 70 wt % or more in the undried separator layer forming step.

When the solid content rate NV of the undried active material layer in forming the undried separator layer is too low, specifically, when the solid content rate NV is lower than 70 wt %, the content of the dispersion medium in the undried active material layer is too large, and hence, it is difficult to form, by application, the undried separator layer on the undried active material layer. On the contrary, in the aforementioned production method, the undried separator layer is formed on the undried active material layer having the solid content rate NV of 70 wt % or more in the undried separator layer forming step, and therefore, the undried separator layer can be appropriately formed, by the application, on the undried active material layer.

Furthermore, in the production method for a separator-including electrode plate, the undried active material layer may be formed by rolling the particle aggregation aggregately containing the wet particles including the active material particles and the dispersion medium in the undried active material layer forming step.

When the undried active material layer is formed by applying the active material paste in a liquid form in which the active material particles are dispersed in the dispersion medium, it is necessary to place the active material paste in a liquid form, and hence, the solid content rate NV of the active material paste cannot be increased. Besides, when the viscosity of the active material paste is too high, it is difficult to prepare and handle the active material paste. Therefore, the solid content rate NV of the active material paste is set to be lower than, for example, 70 wt %. Thus, the solid content rate NV of the undried active material layer formed by this method is also lower than 70 wt %. In this case, in order to form the undried separator layer on the undried active material layer having the solid content rate NV of 70 wt % or more, a step of adjusting the solid content rate NV to 70 wt % or more by half-drying the undried active material layer needs to be performed after the undried active material layer forming step and before the undried separator layer forming step. Besides, as the solid content rate NV of the undried active material layer formed in the undried active material layer forming step is lower, the density of the active material particles in the active material layer obtained by drying is lower, which is unpreferable.

By contrast, in the above-described production method, the undried active material layer is formed by rolling the particle aggregation aggregately containing the wet particles including the active material particle and the dispersion medium in the undried active material layer forming step. Since the wet particles having a solid content rate NV of 70 wt % or more are easily formed, when the particle aggregation of such wet particles is rolled to form the undried active material layer, the undried active material layer having the solid content rate NV of 70 wt % or more can be easily formed. Accordingly, there is no need to adjust the solid content rate NV to 70 wt % or more by half-drying the undried active material layer after the undried active material layer forming step, but the undried separator layer forming step can be performed subsequently to the undried active material layer forming step. Besides, when the solid content rate NV of the undried active material layer formed in the undried active material layer forming step is set as high as 70 wt % or more, the density of the active material particles in the active material layer obtained by drying can be sufficiently high.

Besides, in any of the production methods for a separator-including electrode plate described above, the dispersion medium contained in the undried active material layer is preferably water.

In the production method, the dispersion medium contained in the undried active material layer is water. Besides, the undried separator layer also contains water as described above. Therefore, after forming the undried separator layer on the undried active material layer, even when the dispersion medium (water) contained in the undried active material layer moves into the undried separator layer before forming the separator layer by drying the undried separator layer, the dispersion medium (water) does not harmfully affect the undried separator layer. Besides, in the drying step, as the water contained in the undried separator layer is vaporized from the surface of the undried separator layer, the dispersion medium (water) contained in the undried active material layer moves into the undried separator layer so as to compensate the vaporization. Therefore, the composition of the undried separator layer can be inhibited from abruptly changing during the drying, and hence, the porous separator layer can be more appropriately formed. Furthermore, since water is used as the dispersion medium, environmental load can be reduced.

Another aspect is a production method for a battery having an electrode assembly having a separator-including electrode plate including a current collector foil, an active material layer formed on the current collector foil, and a porous separator layer formed on the active material layer, and the production method includes an electrode plate production step of producing the separator-including electrode plate by any one of the production methods for a separator-including electrode plate described above, an electrode assembly formation step of forming the electrode assembly by using the separator-including electrode plate, and an assembly step of assembling the battery by using the electrode assembly.

In the production method for a battery, since the separator-including electrode plate is produced by the production method for a separator-including electrode plate described above, a separator-including electrode plate in which a separator layer is uniformly formed on an active material layer is obtained. Since the electrode assembly is formed by using the separator-including electrode plate to further assemble a battery, a battery having high reliability can be produced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
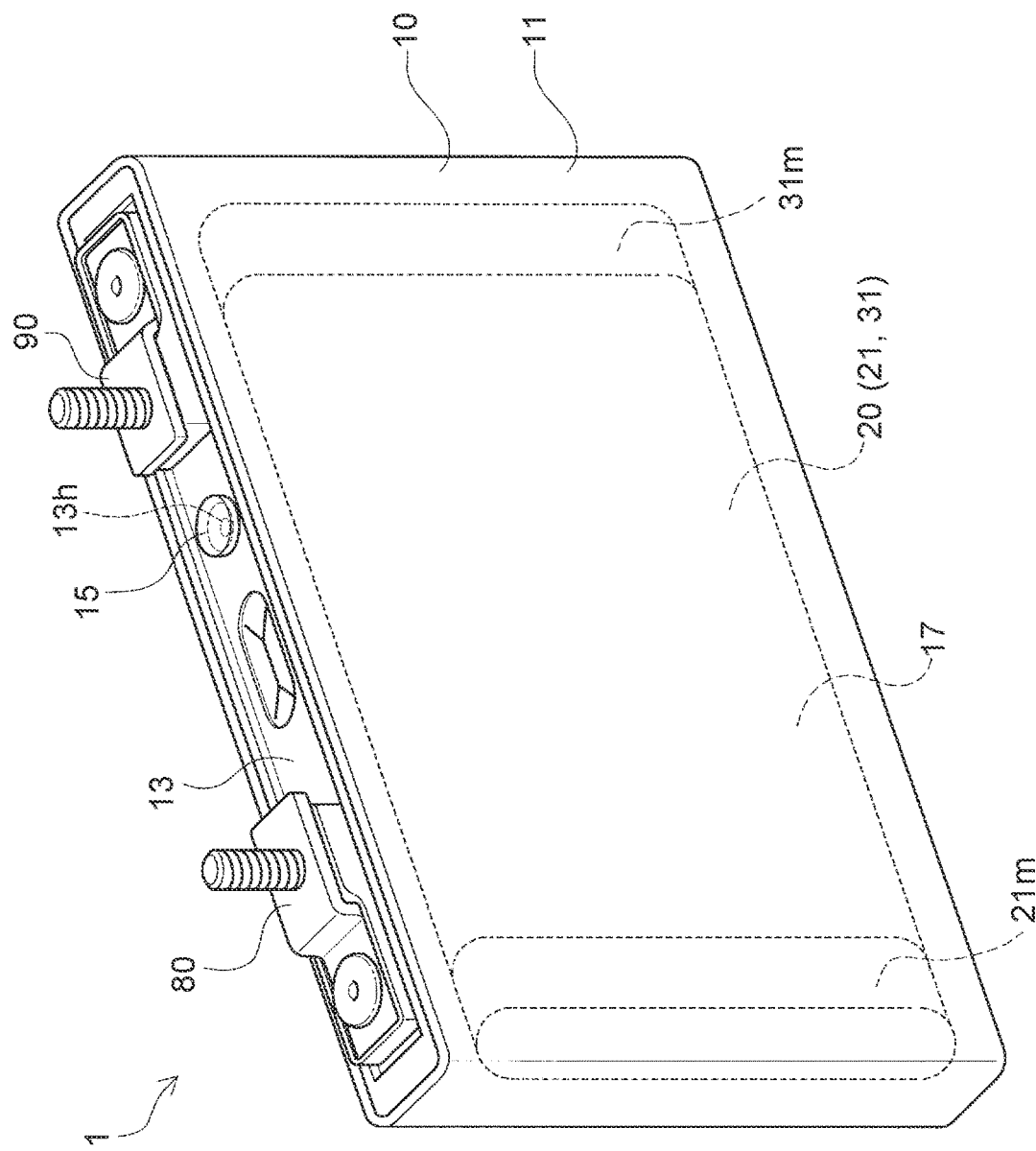
FIG. 1 is a perspective view of a battery according to an embodiment.

Now, an embodiment of the present disclosure will be described with reference to the accompanying drawings. FIG. 1 is a perspective view of a battery 1 according to the present embodiment. The battery 1 is a rectangular sealed lithium ion secondary battery to be provided on a vehicle such as a hybrid vehicle, a plug-in hybrid vehicle or an electric vehicle. The battery 1 includes a rectangular battery case 10, a flat wound electrode assembly 20 and an electrolyte 17 housed in the battery case, a positive electrode terminal portion 80 and a negative electrode terminal portion 90 supported on the battery case 10, and the like.

Among these components, the battery case 10 is in the shape of a rectangular box and is made of a metal (aluminum in the present embodiment). The battery case 10 includes a case body member 11 in a bottomed rectangular cylindrical shape opened on the upper side alone, and a rectangular plate-shaped case cover member 13 welded to close the opening of the case body member 11. On the case cover member 13, the positive electrode terminal portion 80 of aluminum is fixed in a state insulated from the case cover member 13. The positive electrode terminal portion 80 is connected conductively to a positive electrode plate 21 included in the electrode assembly 20 within the battery case 10, and extends to the outside the battery through the case cover member 13. Besides, on the case cover member 13, the negative electrode terminal portion 90 of copper is fixed in a state insulated from the case cover member 13. The negative electrode terminal portion 90 is connected conductively to a separator-including negative electrode plate (separator-including electrode plate) 31 included in the electrode assembly 20 within the battery case 10, and extends to the outside the battery through the case cover member 13.

The electrode assembly 20 is in a flat shape, and is housed in the battery case 10 sideways. The electrode assembly 20 is obtained by overlaying the positive electrode plate 21 in a belt shape and the separator-including negative electrode plate 31 in a belt shape upon each other, and winding the resultant around the axis to be flat.

Figure 2:
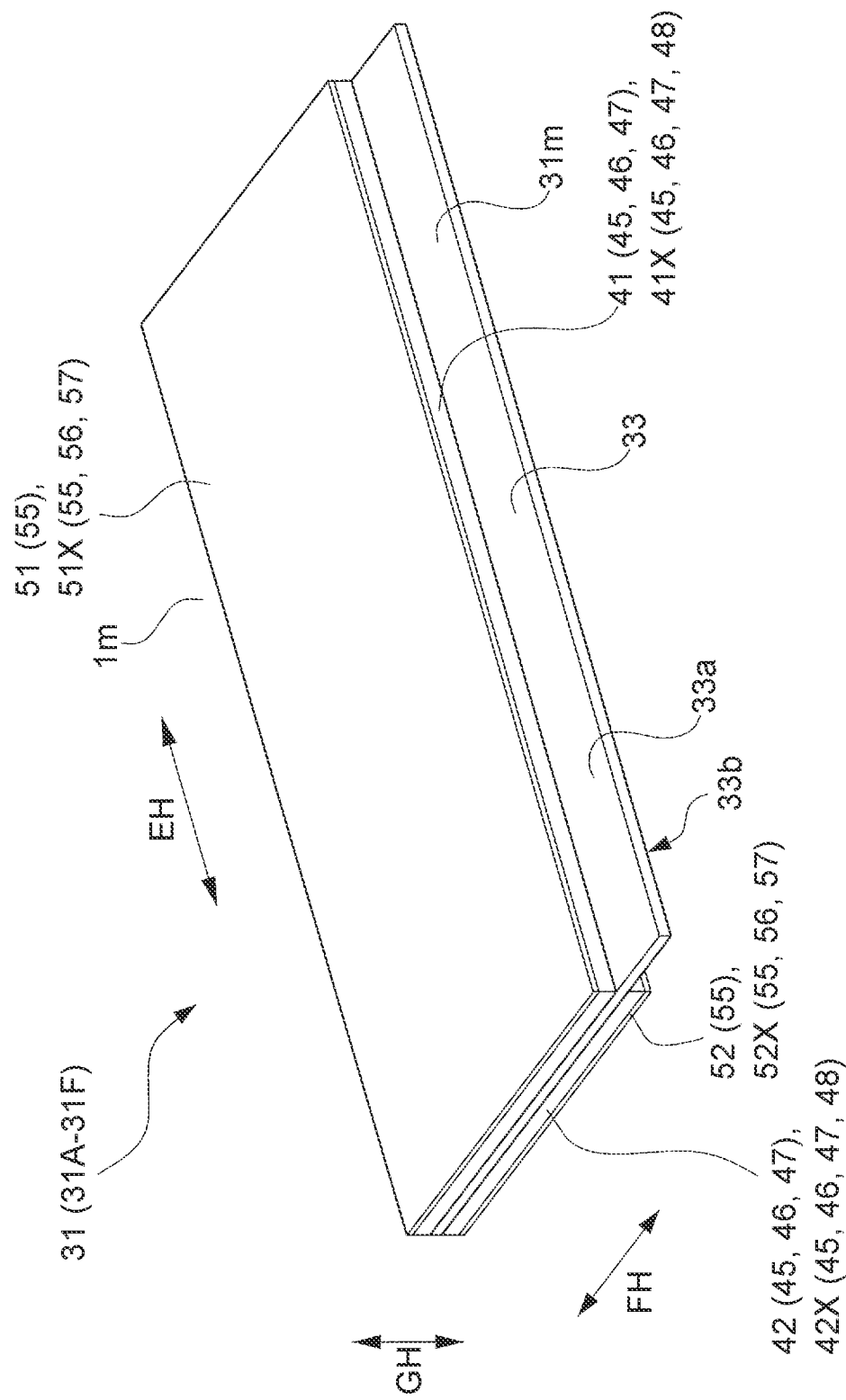
FIG. 2 is a perspective view of a separator-including negative electrode plate according to the embodiment.

First, the separator-including negative electrode plate 31 will be described (see FIG. 2). It is noted that the following description will be given with a lengthwise direction EH, a widthwise direction FH and a thickness direction GH of the separator-including negative electrode plate 31 defined respectively as directions illustrated in FIG. 2. The separator-including negative electrode plate 31 includes a negative electrode current collector foil (current collector foil) 33 made of a belt-shaped copper foil extending in the lengthwise direction EH. On one first principal surface 33a of the negative electrode current collector foil 33, a first negative electrode active material layer (active material layer) 41 is formed in a belt shape along the lengthwise direction EH excluding one end portion along the widthwise direction FH. Besides, also on a second principal surface 33b on the opposite side of the negative electrode current collector foil 33, a second negative electrode active material layer (active material layer) 42 is formed in a belt shape along the lengthwise direction EH excluding one end portion along the widthwise direction FH. Each of the first negative electrode active material layer 41 and the second negative electrode active material layer 42 contains negative electrode active material particles (active material particles) 45, a thickener 46 and an additional additive 47. In the present embodiment, graphite particles are used as the negative electrode active material particles 45, carboxymethyl cellulose (CMC) is used as the thickener 46, and boehmite is used as the additional additive 47.

Besides, on the whole surface of the first negative electrode active material layer 41, a porous first separator layer 51 having a pore size of about 0.5 to 2.0 μm is formed. Also on the whole surface of the second negative electrode active material layer 42, a porous second separator layer 52 having a pore size of about 0.5 to 2.0 μm is formed. Each of the first separator layer 51 and the second separator layer 52 contains a water-soluble polymer 55. In the present embodiment, polyvinyl alcohol (PVA), specifically "Kuraray Poval 105" manufactured by Kuraray Co., Ltd. is used as the water-soluble polymer 55.

Incidentally, the one end portion along the widthwise direction FH of the separator-including negative electrode plate 31 is in a belt shape extending in the lengthwise direction EH, includes none of the first negative electrode active material layer 41, the second negative electrode active material layer 42, the first separator layer 51 and the second separator layer 52 along the thickness direction GH, and works as a negative electrode current collector portion 31m where the negative electrode current collector foil 33 is exposed along the thickness direction GH. To the negative electrode current collector portion 31m, the negative electrode terminal portion 90 (see FIG. 1) is connected (welded).

Next, the positive electrode plate 21 will be described. The positive electrode plate 21 includes a positive electrode current collector foil (not shown) made of a belt-shaped aluminum foil. On one principal surface of the positive electrode current collector foil, a positive electrode active material layer (not shown) is formed in a belt shape along the lengthwise direction excluding one end portion along the widthwise direction. Besides, also on another principal surface on the opposite side of the positive electrode current collector foil, a positive electrode active material layer (not shown) is formed in a belt shape along the lengthwise direction excluding one end portion along the width direction. Each of these positive electrode active material layers contains positive electrode active material particles, conductive particles and a binder. In the present embodiment, lithium transition metal composite oxide particles, specifically, lithium nickel cobalt manganese oxide particles are used as the positive electrode active material particles, acetylene black (AB) particles are used as the conductive particles, and polyvinylidene fluoride (PVDF) is used as the binder. The one end portion along the widthwise direction of the positive electrode plate 21 is in a belt shape extending in the lengthwise direction, does not include a positive electrode active material layer in the thickness direction, and works as a positive electrode current collector portion 21m where the positive electrode current collector foil is exposed. To the positive electrode current collector portion 21m, the positive electrode terminal portion 80 (see FIG. 1) is connected (welded).

Figure 3:
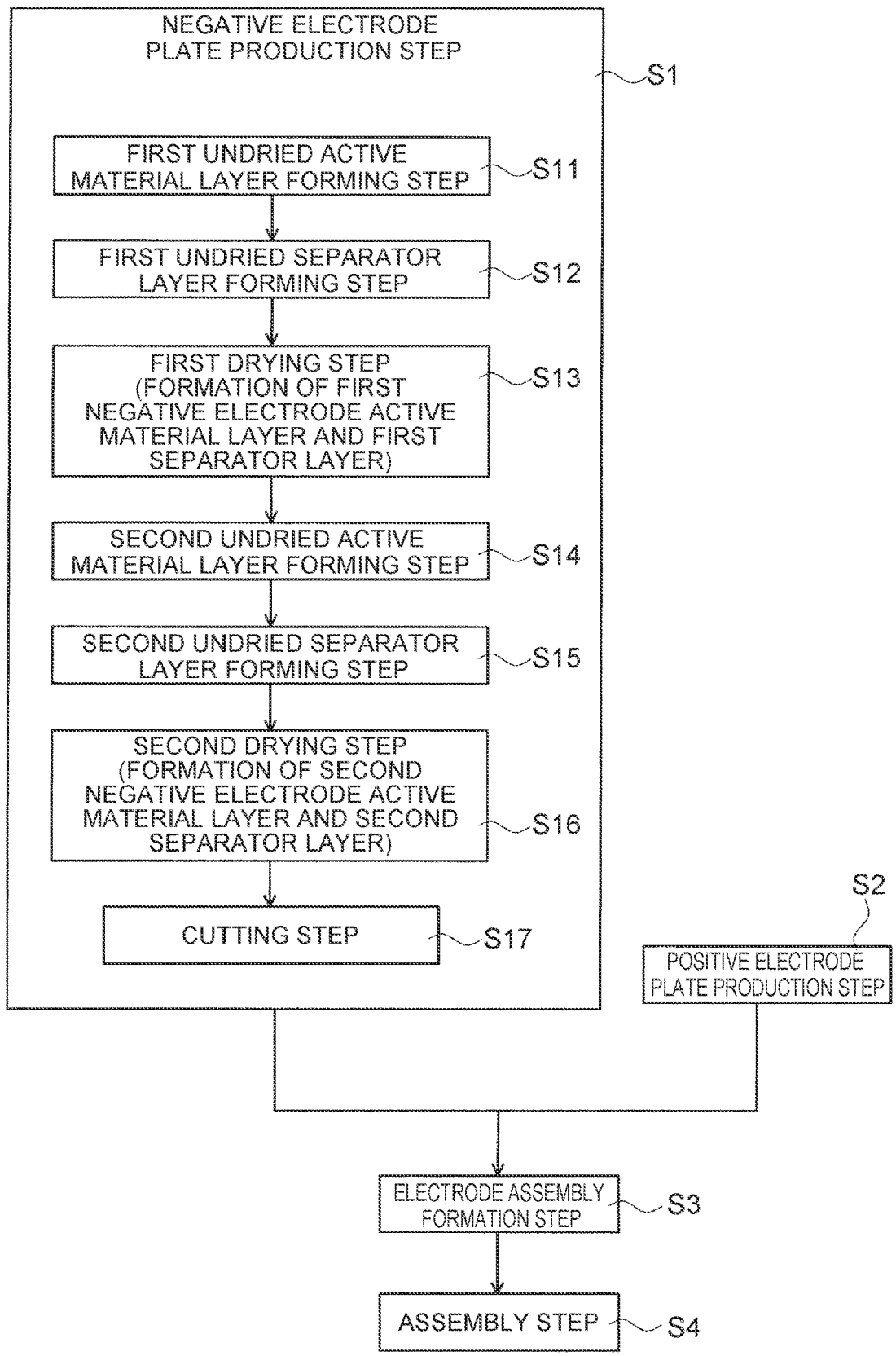
FIG. 3 is a flowchart of a production method for a battery according to the embodiment.

Subsequently, a production method for the separator-including negative electrode plate 31 and a production method for the battery 1 will be described (see FIGS. 3 and 4). First, the production method for the separator-including negative electrode plate 31 (negative electrode plate production step S1) will be described. A particle aggregation 44 aggregately containing negative electrode wet particles 43 having a solid content rate NV of 70 wt % or more (72.0 wt % in the present embodiment) is precedently formed. Specifically, the particle aggregation 44 of the wet particles 43 containing the negative electrode active material particles (graphite particles in the present embodiment) 45, the thickener (CMC in the present embodiment) 46, the additive (boehmite in the present embodiment) 47, and the dispersion medium (water in the present embodiment) 48 is precedently prepared.

Specifically, a thickener dispersion in which the negative electrode active material particles 45, the additive 47 and the thickener 46 are dispersed in the dispersion medium 48 to obtain a solid content rate NV of 72.0 wt % is kneaded using a twin-screw kneader not shown to obtain a clay-like mixture in which these components are homogeneously dispersed. Subsequently, the clay-like mixture is fed to an extruder not shown. The extruder includes an extrusion cylinder including an extrusion screw disposed within the cylinder, and a cutting blade that cuts the clay-like mixture extruded out of the cylinder through a plurality of extrusion holes provided at a tip portion of the extrusion cylinder. The clay-like mixture fed from the twin-screw kneader to the extruder is moved through the extrusion cylinder by the extrusion screw, extruded out of the cylinder through the extrusion holes disposed at the tip portion of the extrusion cylinder, and cut with the cutting blade. Thus, the wet particles 43 each in a cylindrical shape having a solid content rate NV of 72.0 wt % are granulated to produce the particle aggregation 44 aggregately containing the wet particles 43.

Then, in a "first undried active material layer forming step S11" of the "negative electrode plate production step (electrode plate production step) S1" (see FIG. 3), a first undried active material layer 41X obtained by rolling the particle aggregation 44 is formed on the first principal surface 33a of the negative electrode current collector foil 33. Incidentally, procedures from the first undried active material layer forming step S11 to a first drying step S13 described later are performed using an electrode plate production apparatus 100 (see FIG. 4). The electrode plate production apparatus 100 includes a first formation section 110 in which the first undried active material layer 41X is formed, a second formation section 130 in which a first undried separator layer 51X described later is formed, and a drying furnace 150 that simultaneously dries the first undried active material layer 41X and the first undried separator layer 51X.

The first formation section 110 includes three rolls for forming the first undried active material layer 41X on the negative electrode current collector foil 33, specifically, a first roll 111, a second roll 112 disposed at a first roll distance G1 from and in parallel to the first roll 111, and a third roll 113 disposed at a second roll distance G2 from and in parallel to the second roll 112. Each of the first roll 111 to the third roll 113 is connected to a motor (not shown) rotatively driving the corresponding roll.

Besides, the first formation section 110 includes, above the first roll distance G1 between the first roll 111 and the second roll 112, an aggregation supply section 115 that supplies, toward the first roll distance G1, the particle aggregation 44 containing the wet particles 43. Furthermore, the first formation section 110 includes a current collector foil supply roll not shown, and is configured to wind the negative electrode current collector foil 33 drawn out of the current collector foil supply roll around the third roll 113 in such a manner that the second principal surface 33b of the negative electrode current collector foil 33 is in contact with the third roll 113 to convey the negative electrode current collector foil 33 by the third roll 113.

The second formation section 130 includes two conveyance rolls (a first conveyance roll 131 and a second conveyance roll 132). Each of the first conveyance roll 131 and the second conveyance roll 132 is connected to a motor (not shown) for rotatively driving the corresponding roll. The first conveyance roll 131 is disposed on a downstream side from the third roll 113 of the first formation section 110, and comes into contact with the first undried active material layer 41X formed on the first principal surface 33a of the negative electrode current collector foil 33 to convey the negative electrode current collector foil 33 and the first undried active material layer 41X. Besides, the second conveyance roll 132 is disposed on a downstream side from the first conveyance roll 131, and contrary to the first conveyance roll 131, comes into contact with the second principal surface 33b of the negative electrode current collector foil 33 to convey the negative electrode current collector foil 33 and the first undried active material layer 41X.

Besides, the second formation section 130 includes, in the vicinity of the second conveyance roll 132, a solution application section 135 and a solution scrape section 136. The solution application section 135 is a portion where a polymer solution 53 described later is applied onto the first undried active material layer 41X out of the negative electrode current collector foil 33 and the first undried active material layer 41X conveyed by the second conveyance roll 132. Besides, the solution scrape section 136 includes a doctor blade to scrape off an excessive portion of the polymer solution 53 having been applied onto the first undried active material layer 41X. The solution application section 135 and the solution scrape section 136 together form the first undried separator layer 51X.

The drying furnace 150 includes a plurality of conveyance rolls (not shown) and a plurality of hot air outlets (not shown) for blowing out hot air, and is configured in such a manner that the hot air blown out through the respective hot air outlets is blown against the first undried separator layer 51X.

Figure 4:
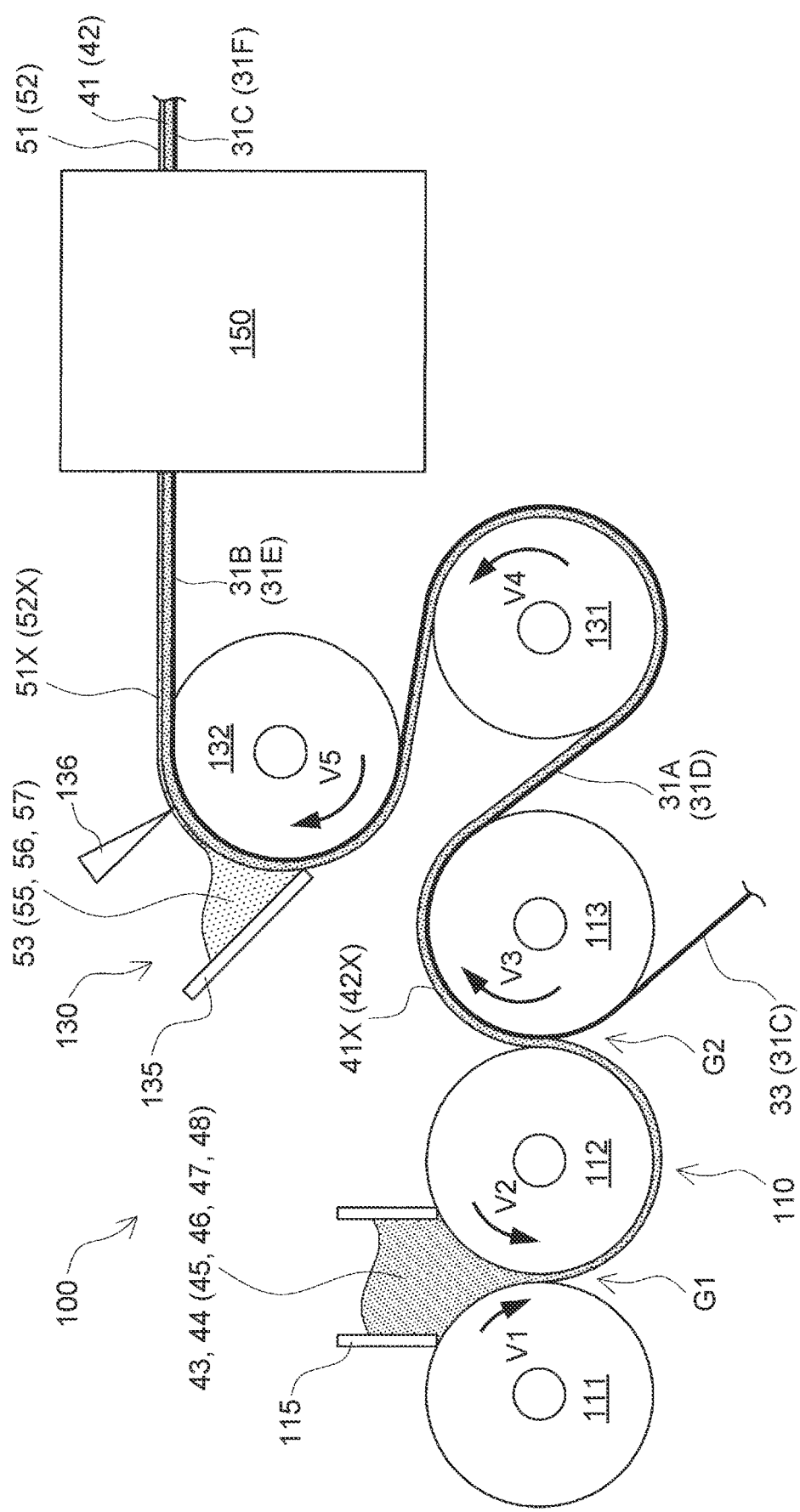
FIG. 4 is an explanatory diagram illustrating formation of a first negative electrode active material layer and a first separator layer on a negative electrode current collector foil according to the embodiment.

In performing the first undried active material layer forming step S11, the first roll 111, the second roll 112, the third roll 113, the first conveyance roll 131 and the second conveyance roll 132 are rotated respectively in rotation directions illustrated with arrows in FIG. 4. Specifically, the first roll 111, the third roll 113 and the second conveyance roll 132 are rotated in the same rotation direction (in the clockwise direction in the present embodiment), and the second roll 112 and the first conveyance roll 131 are rotated in the opposite direction (in the counterclockwise direction in the present embodiment). Besides, a peripheral speed V2 of the second roll 112 is set to be higher than a peripheral speed V1 of the first roll 111, and a peripheral speed V3 of the third roll 113 is set to be higher than the peripheral speed V2 of the second roll 112 (V1<V2<V3). Furthermore, peripheral speeds V4 and V5 of the third roll 113 and the second conveyance roll 132 are set to be equal to the peripheral speed V3 of the third roll 113 (V3=V4=V5).

The particle aggregation 44 of the wet particles 43 charged to the aggregation supply section 115 of the first formation section 110 is supplied toward the first roll distance G1 between the first roll 111 and the second roll 112, rolled by the first roll 111 and the second roll 112, and formed into the first undried active material layer 41X on the second roll 112. The first undried active material layer 41X thus formed on the second roll 112 is conveyed toward the third roll 113.

Subsequently, the undried active material layer 41X thus formed on the second roll 112 is brought, between the second roll 112 and the third roll 113, into contact with the negative electrode current collector foil 33 conveyed by the third roll 113. The first undried active material layer 41X is transferred, between the second roll 112 and the third roll 113, onto the first principal surface 33a of the negative electrode current collector foil 33, and thus, the first undried active material layer 41X is successively formed on the first principal surface 33a of the negative electrode current collector foil 33. It is noted that an electrode plate including the first undried active material layer 41X formed on the negative electrode current collector foil 33 thus obtained is sometimes referred to as the "electrode plate 31A".

Since the solid content rate NV of the wet particles 43 used for forming the first undried active material layer 41X is 70 wt % or more (72.0 wt % in the present embodiment) as described above, the solid content rate NV of the first undried active material layer 41X formed in this step is also 70 wt % or more (about 72 wt % in the present embodiment). When the solid content rate NV of the first undried active material layer 41X is thus as high as 70 wt % or more, the density of the negative electrode active material particles 45 in the first negative electrode active material layer 41 obtained by drying can be sufficiently high.

Subsequently, in a "first undried separator layer forming step S12", the first undried separator layer 51X is formed on the first undried active material layer 41X of the electrode plate 31A described above. Before the first undried separator layer forming step S12, the polymer solution 53 to be used for forming the first undried separator layer 51X is prepared. Specifically, the polymer solution 53 containing the water-soluble polymer (PVA in the present embodiment: "Kuraray Poval 105" manufactured by Kuraray Co., Ltd.) 55, water 56 and the high-boiling point solvent 57 (γ-butyrolactone (GBL) (boiling point: 204° C.)) that is more difficult to dissolve the water-soluble polymer 55 therein than the water 56 and has a higher boiling point than the water 56, in which the water-soluble polymer is dissolved in the polymer solution is prepared.

Specifically, the water-soluble polymer 55 and the water 56 are mixed in a weight ratio of PVA:water of 2:10, and the resultant is heated to 85° C., followed by mixing and stirring until the water-soluble polymer 55 is completely dissolved in the water 56. Thereafter, the thus obtained PVA aqueous solution is mixed with the high-boiling point solvent 57 in a weight ratio of PVA aqueous solution:GBL of 12:7 (a weight ratio of PVA:water:GBL of 2:10:7), followed by stirring and mixing at 85° C. Then, the resultant is naturally cooled to room temperature to obtain the polymer solution 53 in a state where the water-soluble polymer 55 is dissolved therein.

The first undried separator layer forming step S12 is performed in the second formation section 130 of the electrode plate production apparatus 100. The electrode plate 31A including the first undried active material layer 41X formed on the negative electrode current collector foil 33 is conveyed by the first conveyance roll 131 and the second conveyance roll 132. Then, in the solution application section 135, the above-described polymer solution 53 is applied onto the first undried active material layer 41X of the electrode plate 31A. Subsequently, an excessive portion of the polymer solution 53 is scraped off by the solution scrape section 136. In this manner, the first undried separator layer 51X is successively formed on the first undried active material layer 41X. It is noted that an electrode plate including the first undried active material layer 41X formed on the negative electrode current collector foil 33 and the first undried separator layer 51X formed on the first undried active material layer 41X thus obtained is sometimes referred to as the "electrode plate 31B".

In the present embodiment, the first undried separator layer forming step S12 is performed subsequently to the first undried active material layer forming step S11, and hence, the dispersion medium 48 contained in the first undried active material layer 41X minimally vaporizes after the formation of the first undried active material layer 41X and before the formation of the first undried separator layer 51X thereon. Therefore, the solid content rate NV of the first undried active material layer 41X at the time of the formation of the first undried separator layer 51X is minimally changed from the solid content rate NV at the time of the formation of the first undried active material layer 41X, and is about 72 wt %.

Here, although detailed results are not described, when the solid content rate NV of the first undried active material layer 41X at the time of the formation of the first undried separator layer 51X is too low, specifically, when the solid content rate NV is lower than 70 wt %, the content of the dispersion medium 48 in the first undried active material layer 41X is so high that the first undried separator layer 51X is difficult to be formed by the application on the first undried active material layer 41X. Therefore, it has been revealed that the solid content rate NV of the first undried active material layer 41X at the time of the formation of the first undried separator layer 51X is preferably 70 wt % or more.

Subsequently, in a "first drying step S13", the first undried separator layer 51X is dried to form the first separator layer 51, and the first undried active material layer 41X is dried to form the first negative electrode active material layer 41. Specifically, the electrode plate 31B is conveyed into the drying furnace 150, and during the conveyance in the drying furnace 150, hot air at 120° C. is blown out through the hot air outlets against the first undried separator layer 51X included in the electrode plate 31B. First, the water 56 contained in the first undried separator layer 51X gradually vaporizes from the surface of the first undried separator layer 51X, and hence the water-soluble polymer 55 dissolved therein is deposited in the shape of a three-dimensional network. Subsequently, the high-boiling point solvent 57 vaporizes to form the porous first separator layer 51. At the same time, the dispersion medium 48 contained in the first undried active material layer 41X also gradually vaporizes through the first undried separator layer 51X from the surface of the first undried separator layer 51X to form the first negative electrode active material layer 41. It is noted that an electrode plate including the first negative electrode active material layer 41 formed on the negative electrode current collector foil 33 and the first separator layer 51 formed on the first negative electrode active material layer 41 thus obtained is sometimes referred to as the "electrode plate 31C".

Next, in a "second undried active material layer forming step S14", the electrode plate production apparatus 100 separately prepared is used to form, in the same manner as in the first undried active material layer forming step S11, a second undried active material layer 42X on the second principal surface 33b of the negative electrode current collector foil 33 of the electrode plate 31C. Specifically, the particle aggregation 44 charged to the aggregation supply section 115 is rolled by the first roll 111 and the second roll 112, and formed into the second undried active material layer 42X on the second roll 112. Subsequently, the second undried active material layer 42X is transferred, between the second roll 112 and the third roll 113, onto the second principal surface 33b of the negative electrode current collector foil 33 of the electrode plate 31C, and thus, the second undried active material layer 42X is successively formed on the second principal surface 33b. It is noted that the resultant electrode plate is sometimes referred to as the "electrode plate 31D".

Subsequently, in a "second undried separator layer forming step S15", a second undried separator layer 52X is formed on the second undried active material layer 42X of the electrode plate 31D in the same manner as in the first undried separator layer forming step S12. Specifically, the electrode plate 31D is conveyed by the first conveyance roll 131 and the second conveyance roll 132, and in the solution application section 135, the above-described polymer solution 53 is applied onto the second undried active material layer 42X of the electrode plate 31D. Then, an excessive portion of the polymer solution 53 is scraped off by the solution scrape section 136, and thus, the second undried separator layer 52X is successively formed on the second undried active material layer 42X. It is noted that the resultant electrode plate is sometimes referred to as the "electrode plate 31E".

Subsequently, in a "second drying step S16", the second separator layer 52 is formed by drying the second undried separator layer 52X and the second negative electrode active material layer 42 is formed by drying the second undried active material layer 42X in the same manner as in the first drying step S13. Specifically, the electrode plate 31E is conveyed into the drying furnace 150, and hot air at 120° C. is blown against the second undried separator layer 52X included in the electrode plate 31E. First, the water 56 contained in the second undried separator layer 52X gradually vaporizes, and hence the water-soluble polymer 55 is deposited in the shape of a three-dimensional network. Subsequently, the high-boiling point solvent 57 vaporizes to form the porous second separator layer 52. At the same time, the dispersion medium 48 contained in the second undried active material layer 42X also gradually vaporizes through the second undried separator layer 52X to form the second negative electrode active material layer 42. It is noted that the resultant electrode plate is sometimes referred to as the "electrode plate 31F".

Next, in a "cutting step S17", the electrode plate 31F is cut along the lengthwise direction EH in half at the center of the width direction FH. In this manner, the separator-including negative electrode plate 31 illustrated in FIG. 2 is produced. It is noted that a roll pressing step of roll pressing the electrode plate 31F may be performed before the cutting step S17.

Furthermore, the positive electrode plate 21 is separately produced in a "positive electrode plate production step S2". A particle aggregation (not shown) aggregately containing positive electrode wet particles is precedently formed. Specifically, the particle aggregation of the wet particles containing positive electrode active material particles (lithium nickel cobalt manganese oxide particles in the present embodiment), conductive particles (AB particles in the present embodiment), a binder (PVDF in the present embodiment), and a dispersion medium (N-methyl pyrrolidone (NMP) in the present embodiment) is prepared. Specifically, in the same manner as in the formation of the particle aggregation 44 of the negative electrode wet particles 43, a twin-screw kneader not shown is used to knead the positive electrode active material particles, the conductive particles, the binder and the dispersion medium to obtain a clay-like mixture in which these components are homogeneously dispersed. Subsequently, an extruder not shown is used to granulate cylindrical wet particles, and thus, the particle aggregation aggregately containing the wet particles is obtained.

Next, a roll press apparatus including three rolls similarly to the first formation section 110 of the electrode plate production apparatus 100 is used to form a first undried active material layer on one principal surface of the positive electrode current collector foil. Thereafter, the first undried active material layer is dried in a drying furnace to form a first positive electrode active material layer on the positive electrode current collector foil. Similarly, a second undried active material layer is formed also on another principal surface of the positive electrode current collector foil, and the resultant is dried to form a second positive electrode active material layer on the positive electrode current collector foil. Then, the resultant positive electrode plate is roll pressed to increase the density of the first positive electrode active material layer and the second positive electrode active material layer. Thereafter, the positive electrode plate is cut along the lengthwise direction in half at the center along the widthwise direction. Thus, the positive electrode plate 21 is produced.

Next, in an "electrode assembly formation step S3", the electrode assembly 20 is formed. Specifically, the positive electrode plate 21 in a belt shape and the separator-including negative electrode plate 31 in a plate shape are overlaid upon each other, and the resultant is wound around the axis by using a winding core. Besides, the resultant is compressed flat to obtain the flat wound electrode assembly 20 (see FIG. 1).

Next, in an "assembly step S4", the battery 1 is assembled. Specifically, the case cover member 13 is prepared, and the positive electrode terminal portion 80 and the negative electrode terminal portion 90 are fixed thereon (see FIG. 1). Thereafter, the positive electrode terminal portion 80 and the negative electrode terminal portion 90 are welded respectively to the positive electrode current collector portion 21m of the positive electrode plate 21 and the negative electrode current collector portion 31m of the separator-including negative electrode plate 31 of the electrode assembly 20. Next, the electrode assembly 20 is covered with an insulating film envelope not shown, the resultant is inserted into the case body member 11, and the opening of the case body member 11 is closed by the case cover member 13. Then, the case body member 11 and the case cover member 13 are welded to each other to form the battery case 10. Thereafter, the electrolyte 17 is injected into the battery case 10 through an injection hole 13h to be impregnated in the electrode assembly 20. Thereafter, the injection hole 13h is sealed with a sealing member 15.

Thereafter, the thus obtained battery 1 is initially charged. Besides, the battery 1 is subjected to various tests. In this manner, the battery 1 is completed.

EXAMPLE 1 AND COMPARATIVE EXAMPLE 1

Next, results of a test performed for verifying the effects of the present disclosure will be described. In Example 1, the separator-including negative electrode plate 31 was produced in the same manner as described above in the embodiment. Specifically, in Example 1, the polymer solution 53 was prepared by using PVA ("Kuraray Poval 105" manufactured by Kuraray Co., Ltd.) as the water-soluble polymer 55 and GBL as the high-boiling point solvent 57, and by mixing the water-soluble polymer 55, water 56 and the high-boiling point solvent 57 at a weight ratio of PVA:water:GBL of 2:10:7 (see also Table 1 below).

Subsequently to the first undried active material layer forming step S11, the polymer solution 53 was used to form the first undried separator layer 51X on the first undried active material layer 41X in the first undried separator layer forming step S12, and thereafter, in the first drying step S13, the first undried separator layer 51X and the first undried active material layer 41X were simultaneously dried to form the first separator layer 51 and the first negative electrode active material layer 41. Besides, subsequently to the second undried active material layer forming step S14, the polymer solution 53 was used to form the second undried separator layer 52X on the second undried active material layer 42X in the second undried separator layer forming step S15, and thereafter, in the second drying step S16, the second undried separator layer 52X and the second undried active material layer 42X were simultaneously dried to form the second separator layer 52 and the second negative electrode active material layer 42.

TABLE 1

| | Water-soluble Polymer | High-boiling Point Solvent | Composition of Polymer Solution (Water-soluble Polymer:Water:High-boiling Point Solvent) | Formation of Undried Separator Layer | State of Separator Layer |
|---|---|---|---|---|---|
| Example 1 | PVA(Kuraray Poval 105) | GBL | 2:10:7 | Formed on Undried Active Material Layer | Uniform |
| Comparative Example 1 | | | | Formed on Dried Negative Electrode Active Material Layer | Voids/through-holes |
| Example 2 | PVA(Kuraray Poval 105) | GBL | 2:9:7 | Formed on Undried Active Material Layer | Uniform |
| Comparative Example 2 | | | | Formed on Dried Negative Electrode Active Material Layer | Voids/through-holes |

TABLE 1-continued

|  | Water-soluble Polymer | High-boiling Point Solvent | Composition of Polymer Solution (Water-soluble Polymer:Water:High-boiling Point Solvent) | Formation of Undried Separator Layer | State of Separator Layer |
|---|---|---|---|---|---|
| Example 3 | PVA(Kuraray Poval 205) | PC | 2:10:5 | Formed on Undried Active Material Layer | Uniform |
| Comparative Example 3 | | | | Formed on Dried Negative Electrode Active Material Layer | Voids/through-holes |

Figure 5:
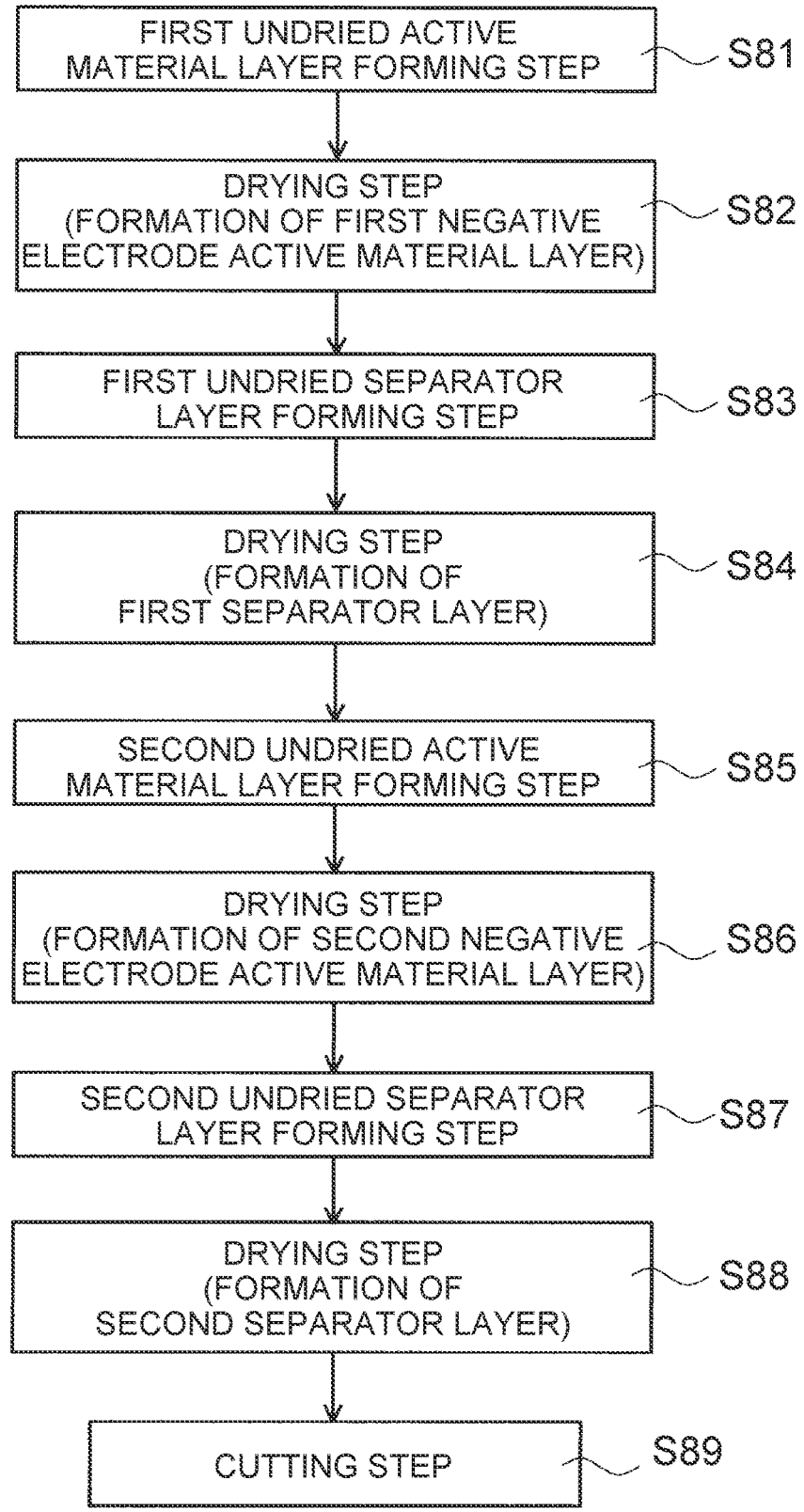
FIG. 5 is a flowchart of a production method for a separator-including negative electrode plate according to a comparative embodiment.

On the other hand, in Comparative Example 1, although the polymer solution 53 the same as that used in Example 1 (the embodiment) was used, the separator-including negative electrode plate 31 was produced by a method different from that of Example 1 (see FIG. 5). Specifically, in a first undried active material layer forming step S81 similar to the first undried active material layer forming step S11 of Example 1, the first undried active material layer 41X was formed on the first principal surface 33a of the negative electrode current collector foil 33. Then, the first undried active material layer 41X was dried by heating to form the first negative electrode active material layer 41 in a drying step S82. Thereafter, in a first undried separator layer forming step S83, the first undried separator layer 51X was formed on the first negative electrode active material layer 41 obtained by drying, and then, in a drying step S84, the first undried separator layer 51X was dried by heating to form the first separator layer 51.

Next, the second undried active material layer 42X was formed on the second principal surface 33b of the negative electrode current collector foil 33 in a second undried active material layer forming step S85, and then, the second undried active material layer 42X was dried by heating to form the second negative electrode active material layer 42 in a drying step S86. Thereafter, in a second undried separator layer forming step S87, the second undried separator layer 52X was formed on the second negative electrode active material layer 42 obtained by drying, and thereafter, the second undried separator layer 52X was dried by heating to form the second separator layer 52 in a drying step S88. Thereafter, a cutting step S89 similar to the cutting step S17 of Example 1 was performed to obtain the separator-including negative electrode plate 31.

EXAMPLE 2 AND COMPARATIVE EXAMPLE 2

In Example 2, the separator-including negative electrode plate 31 was produced in the same manner as in Example 1 (see FIG. 4) except that the polymer solution 53 different from the polymer solution 53 of Example 1 was used to form the undried separator layers 51X, 52X. Specifically, in Example 2, the water-soluble polymer 55, water 56 and the high-boiling point solvent 57 were mixed in a weight ratio of PVA:water:GBL of 2:9:7, as shown in Table 1, to prepare the polymer solution 53. On the other hand, in Comparative Example 2, the separator-including negative electrode plate 31 was produced in the same manner as in Comparative Example 1 (see FIG. 5) except that the polymer solution 53 the same as that of Example 2 was used.

EXAMPLE 3 AND COMPARATIVE EXAMPLE 3

In Example 3, the separator-including negative electrode plate 31 was produced in the same manner as in Examples 1 and 2 (see FIG. 4) except that the polymer solution 53 different from the polymer solutions used in Examples 1 and 2 was used to form the undried separator layers 51X, 52X. Specifically, in Example 3, PVA, specifically "Kuraray Poval 205" manufactured by Kuraray Col, Ltd. was used as the water-soluble polymer 55, and propylene carbonate (PC) (boiling point: 240° C.) was used as the high-boiling point solvent 57, as shown in Table 1. Besides, the polymer solution 53 was prepared by mixing the water-soluble polymer 55, water 56 and the high-boiling point solvent 57 in a weight ratio of PVA:water:PC of 2:10:5. On the other hand, in Comparative Example 3, the separator-including negative electrode plate 31 was produced in the same manner as in Comparative Examples 1, 2 described above (see FIG. 5) except that the polymer solution 53 the same as the polymer solution used in Example 3 was used.

Figure 6A:
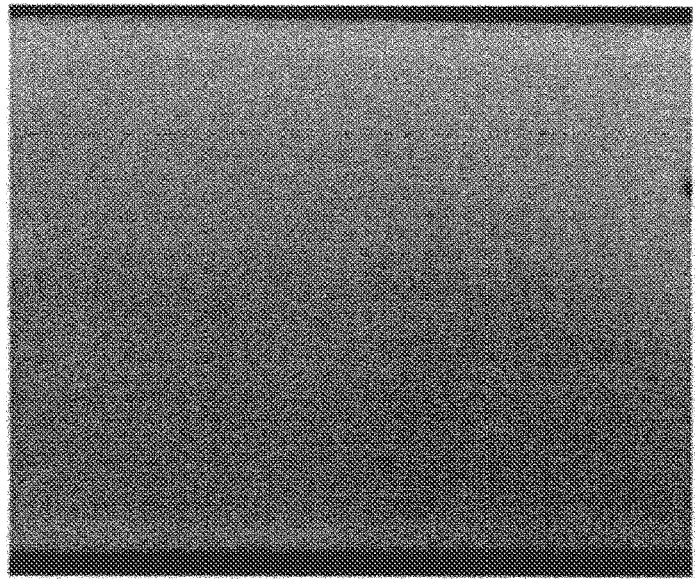
FIG. 6A is a photograph of a surface of a first separator layer included in a separator-including negative electrode plate according to Example 1.
Figure 6B:
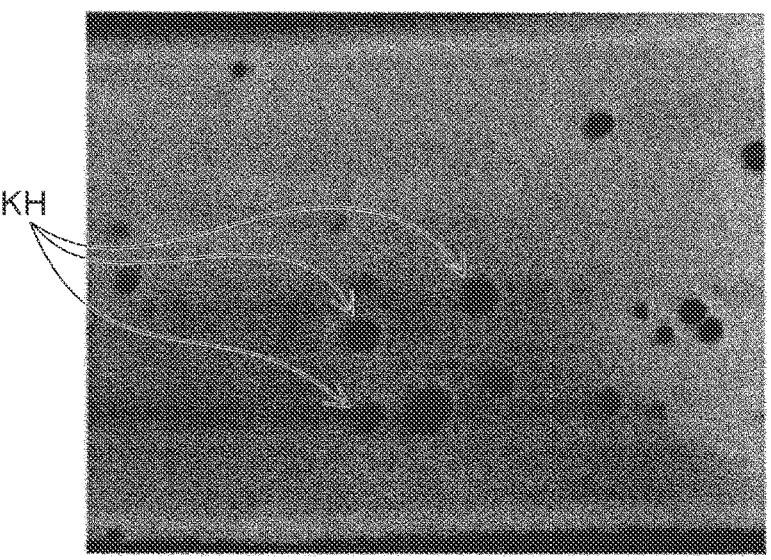
FIG. 6B is a photograph of a surface of a first separator layer included in a separator-including negative electrode plate according to Comparative Example 1.

Next, in each of the separator-including negative electrode plates 31 of Examples 1 to 3 and Comparative Examples 1 to 3, the separator layer (first separator layer) 51 was visually observed. FIG. 6A illustrates photograph of the surface of the separator layer 51 of Example 1 and FIG. 6B illustrates photograph of the surface of the separator layer 51 of Comparative Example 1. In the separator layers 51 of Comparative Examples 1 to 3, large through-holes (holes penetrating through the separator layers 51 and exposing the negative electrode active material layers 41 on the bottoms) KH having a diameter of about 3 to 10 mm (imaged as black portions in FIG. 6B) are formed in some places. Although not clear in the photograph of FIG. 6B, voids were formed in some places inside the separator layers 51 of Comparative Examples 1 to 3. On the contrary, the separator layers 51 of Examples 1 to 3 had neither through-holes KH nor voids, and were uniformly formed.

Such results were obtained probably for the following reasons: In Comparative Examples 1 to 3, the undried separator layer 51X is formed by applying the polymer solution 53 onto the dried negative electrode active material layer 41, and hence, before the separator layer 51 is formed by drying the undried separator layer 51X, a part of the polymer solution 53 used for forming the undried separator layer 51X enters voids of the negative electrode active material layer 41, and the air present in the voids of the negative electrode active material layer 41 moves into the undried separator layer 51X. Therefore, the air thus moving forms voids in the undried separator layer 51X, and furthermore, the voids are enlarged to form through-holes KH in the undried separator layer 51X. Thus, these voids and through-holes KH remain in the separator layer 51 obtained by drying.

On the contrary, in Examples 1 to 3, the undried separator layer 51X is formed by applying the polymer solution 53 without drying the undried active material layer 41X after forming the undried active material layer 41X on the negative electrode current collector foil 33. Since few voids are present in the undried active material layer 41X, the phenomenon that a part of the polymer solution 53 used for forming the undried separator layer 51X enters voids of the undried active material layer 41X and thus the air present in the voids of the undried active material layer 41X moves into the undried separator layer 51X before forming the separator layer 51 by drying the undried separator layer 51X can be prevented. Accordingly, the formation of voids and through-holes KH in the undried separator layer 51X and also the formation of voids and through-holes in the dried separator layer 51 can be prevented, and thus, the separator layer 51 can be uniformly formed.

As described so far, in the production method for the separator-including negative electrode plate 31, the undried active material layers 41X, 42X are formed on the negative electrode current collector foil 33, and then, with the dispersion medium 48 contained in the undried active material layers 41X, 42X, the polymer solution 53 is applied to form the undried separator layers 51X, 52X on the undried active material layers 41X, 42X. In particular, in the aforementioned embodiment, the undried separator layers 51X, 52X are formed subsequently to the formation of the undried active material layers 41X, 42X, and hence, the undried active material layers 41X, 42X are filled with the dispersion medium 48 and few voids are present in the undried active material layers 41X, 42X. Therefore, the phenomenon that a part of the polymer solution 53 used for forming the undried separator layers 51X, 52X enters voids of the undried active material layers 41X, 42X and thus the air present in the voids of the undried active material layers 41X, 42X moves into the undried separator layers 51X, 52X before the separator layers 51, 52 are formed by drying the undried separator layers 51X, 52X can be prevented. Accordingly, the formation of voids and through-holes KH in the undried separator layers 51X, 52X and also the formation of voids and through-holes KH in the dried separator layers 51, 52 can be prevented, and thus, the separator layers 51, 52 can be uniformly formed on the negative electrode active material layers 41, 42.

Besides, in the production method for the separator-including negative electrode plate 31, the undried separator layers 51X, 52X are formed on the undried active material layers 41X, 42X having a solid content rate NV of 70 wt % or more in the undried separator layer forming steps S12, S15, and therefore, the undried separator layers 51X, 52X can be appropriately formed by the application on the undried active material layers 41X, 42X.

When the undried active material layers 41X, 42X are formed by applying a negative electrode active material paste in a liquid form, it is necessary to place the negative electrode active material paste in a liquid form, and hence, the solid content rate NV of the negative electrode active material paste cannot be increased. Besides, when the viscosity of the negative electrode active material paste is too high, it is difficult to prepare and handle the negative electrode active material paste. Therefore, the solid content rate NV of the negative electrode active material paste is set to be lower than, for example, 70 wt %. Thus, the solid content rate NV of the undried active material layers 41X, 42X formed by this method is also lower than 70 wt %. In this case, in order to form the undried separator layers 51X, 52X on the undried active material layers 41X, 42X having the solid content rate NV of 70 wt % or more, a step of adjusting the solid content rate NV to 70 wt % or more by half-drying the undried active material layers 41X, 42X needs to be performed after the undried active material layer forming steps S11, S14 and before the undried separator layer forming steps S12, S15. Besides, as the solid content rate NV of the undried active material layers 41X, 42X formed in the undried active material layer forming steps S11, S14 is lower, the density of the active material particles 45 in the negative electrode active material layers 41, 42 obtained by drying is lower, which is unpreferable.

By contrast, in the production method for the separator-including negative electrode plate 31, the undried active material layers 41X, 42X are formed by rolling the particle aggregation 44 aggregately containing the wet particles 43. Since the wet particles 43 having a solid content rate NV of 70 wt % or more are easily formed, when the particle aggregation 44 of such wet particles 43 is rolled to form the undried active material layers 41X, 42X, the undried active material layers 41X, 42X having the solid content rate NV of 70 wt % or more can be easily formed. Accordingly, there is no need to adjust the solid content rate NV to 70 wt % or more by half-drying the undried active material layers 41X, 42X after the undried active material layer forming steps S11, S14, and the undried separator layer forming steps S12, S15 can be performed subsequently to the undried active material layer forming steps S11, S14. Besides, when the solid content rate NV of the undried active material layers 41X, 42X formed in the undried active material layer forming steps S11, S14 is as high as 70 wt % or more, the density of the negative electrode active material particles 45 in the negative electrode active material layers 41, 42 obtained by drying can be sufficiently high.

In the production method for the separator-including negative electrode plate 31, the dispersion medium 48 contained in the undried active material layers 41X, 42X is water, and in addition, the undried separator layers 51X, 52X also contain the water 56. Therefore, after forming the undried separator layers 51X, 52X on the undried active material layers 41X, 42X, even when the dispersion medium (water) 48 contained in the undried active material layers 41X, 42X moves into the undried separator layers 51X, 52X before forming the separator layers 51, 52 by drying the undried separator layers 51X, 52X, the dispersion medium (water) 48 does not harmfully affect the undried separator layers 51X, 52X. Besides, in the drying steps S13 and S16, as the water 56 contained in the undried separator layers 51X, 52X vaporizes from the surfaces of the undried separator layers 51X, 52X, the dispersion medium (water) 48 contained in the undried active material layers 41X, 42X moves into the undried separator layers 51X, 52X so as to compensate the vaporization. Therefore, the compositions of the undried separator layers 51X, 52X can be inhibited from abruptly changing during the drying, and hence, the porous separator layers 51, 52 can be more appropriately formed.

Besides, in the production method for the battery 1, since the separator-including negative electrode plate 31 is produced by the production method for the separator-including negative electrode plate 31, the separator-including negative electrode plate 31 in which the separator layers 51, 52 are uniformly formed on the negative electrode active material layers 41, 42 is obtained. Since the electrode assembly 20 is formed by using the separator-including negative electrode plate 31 to further assemble the battery 1, the battery 1 having high reliability can be produced.

Although the present disclosure has been described so far with reference to the embodiment and Examples 1 to 3, it goes without saying that the present disclosure is not limited to the embodiment and Examples 1 to 3 but may be appropriately modified and changed without departing from the spirit and scope thereof. For example, although the production method of the present disclosure is applied to the separator-including negative electrode plate 31 including the negative electrode active material layers 41, 42 on the both surfaces of the negative electrode current collector foil 33 and the separator layers 51, 52 further thereon in the above-described embodiment, a separator-including electrode plate to which the production method of the present disclosure is applied is not limited to one having this structure. For example, the production method of the present disclosure can be applied to a separator-including negative electrode plate including a negative electrode active material on merely one surface of the negative electrode current collector foil 33 and a separator layer merely on the negative electrode active material layer.

Besides, although the polymer solution 53 was obtained by heating the water-soluble polymer 55, the water 56 and the high-boiling point solvent 57, mixing and stirring the resultant until the water-soluble polymer 55 was dissolved therein, and naturally cooling the resultant to room temperature in the embodiment, a method for preparing the polymer solution 53 is not limited to this method. The polymer solution 53 can be produced, for example, by stirring and mixing the water-soluble polymer 55, the water 56 and the high-boiling point solvent 57 at room temperature without heating until the water-soluble polymer 55 is dissolved therein.

Furthermore, although the undried active material layers 41X, 42X were formed by rolling the particle aggregation 44 aggregately containing the wet particles 43 in the embodiment, the method for forming the undried active material layers 41X, 42X is not limited to this method. For example, the undried active material layers 41X, 42X can be formed by applying, onto the negative electrode current collector foil 33, a negative electrode active material paste in a liquid form containing the negative electrode active material particles 45, the thickener 46, the additive 47 and the dispersion medium 48.

Besides, although the flat wound electrode assembly 20 obtained by overlaying the belt-shaped positive electrode plate 21 and the belt-shaped separator-including negative electrode plate 31 upon each other and winding the resultant to be flat was formed as the electrode assembly 20 of the battery 1 in the embodiment, the structure of the battery assembly 20 is not limited to this. For example, the belt-shaped positive electrode plate 21 may be cut into a rectangular positive electrode plate, and the belt-shaped separator-including negative electrode plate 31 may be cut into a rectangular negative electrode plate, so that the rectangular positive electrode plate and the rectangular separator-including negative electrode plate may be alternately stacked into a plurality of layers to obtain a rectangular parallelepiped stacked battery body.

What is claimed is:

1. A production method for a separator-including electrode plate including a current collector foil, an active material layer formed on the current collector foil, and a porous separator layer formed on the active material layer, the production method comprising:
    an undried active material layer forming step of forming, on the current collector foil, an undried active material layer containing an active material particle and a dispersion medium;
    an undried separator layer forming step of forming, on the undried active material layer, an undried separator layer by applying, with the dispersion medium contained in the undried active material layer, a polymer solution containing a water-soluble polymer, water, and a high-boiling point solvent that is more difficult to dissolve the water-soluble polymer therein than in water and has a higher boiling point than water, wherein the water-soluble polymer is dissolved in the polymer solution; and
    a drying step of forming the porous separator layer by vaporizing the high-boiling point solvent after depositing the water-soluble polymer in the shape of a three-dimensional network by vaporizing the water contained in the undried separator layer, and forming the active material layer by vaporizing the dispersion medium contained in the undried active material layer.

2. The production method for a separator-including electrode plate according to claim 1, wherein the undried separator layer is formed on the undried active material layer having a solid content rate NV of 70 wt % or more in the undried separator layer forming step.

3. The production method for a separator-including electrode plate according to claim 2, wherein the undried active material layer is formed by rolling a particle aggregation aggregately containing wet particles including the active material particle and the dispersion medium in the undried active material layer forming step.

4. The production method for a separator-including electrode plate according to claim 1, wherein the dispersion medium contained in the undried active material layer is water.

5. A production method for a battery comprising an electrode assembly having a separator-including electrode plate including a current collector foil, an active material layer formed on the current collector foil, and a porous separator layer formed on the active material layer, the production method comprising:
    an electrode plate production step of producing the separator-including electrode plate by the production method for a separator-including electrode plate according to claim 1;
    an electrode assembly formation step of forming the electrode assembly by using the separator-including electrode plate; and
    an assembly step of assembling the battery by using the electrode assembly.

* * * * *